United States Patent [19]

Meister et al.

[11] Patent Number: 5,051,265

[45] Date of Patent: Sep. 24, 1991

[54] PREPARATION OF CRUDE CHOCOLATE POWDER AND PRODUCTS THEREFROM

[75] Inventors: Niklaus Meister, Grosshoechstetten; Hans-Josef Piek, Rossens, both of Switzerland

[73] Assignee: Nestec S.A., Vevey, Switzerland

[21] Appl. No.: 467,977

[22] Filed: Jan. 22, 1990

[30] Foreign Application Priority Data

Feb. 14, 1989 [CH] Switzerland .......................... 512/89

[51] Int. Cl.$^5$ .......................... A23C 9/18; A23G 1/00
[52] U.S. Cl. ...................................... 426/96; 426/471; 426/491; 426/584; 426/585; 426/631; 426/660
[58] Field of Search .............. 426/471, 472, 584, 585, 426/587, 588, 613, 631, 659, 660, 572, 388, 96

[56] References Cited

U.S. PATENT DOCUMENTS 4,871,573 10/1989 Bohren et al. ...................... 426/585

OTHER PUBLICATIONS

Webb, B. and Johnson, A., 1965, "Fundamentals of Dairy Chemistry", AVI Publishing, Westport, Conn.

Primary Examiner—Donald E. Czaja
Assistant Examiner—John C. Mowbray
Attorney, Agent, or Firm—Vogt & O'Donnell

[57] ABSTRACT

To produce a powder for milk chocolate having a high percentage content of free fats, milk, cocoa mass and sugar are mixed, a fatty phase, an aqueous phase and a residue are separated by centrifugation, the residue is incorporated in the aqueous phase and the dispersion obtained is concentrated and seeded with lactose, the fatty phase pasteurized and homogenized at elevated temperature is added and the mixture is sprayed cold under high pressure into a drying tower through which a stream of very hot air is passed.

The powder obtained has a pure cocoa aroma and a milk note. Its rheological properties facilitate its processing to chocolate.

19 Claims, No Drawings

PREPARATION OF CRUDE CHOCOLATE POWDER AND PRODUCTS THEREFROM

BACKGROUND OF THE INVENTION

This invention relates to a process for the production of a powder for use in the manufacture of milk chocolate.

In one traditional process known as dry mixing, milk chocolate is produced from a mixture of milk powder, sugar, cocoa mass and cocoa butter which forms a crude chocolate mixture. This mixture is finely ground and the resulting powder is refined and liquefied by kneading in conches. The chocolate mass is then conditioned and moulded. The crude chocolate mixture has to have the lowest possible residual moisture content so that it can be satisfactorily worked in the conches and to ensure that the paste has the appropriate rheological properties for moulding and demoulding. To achieve this result, the milk is dried in a thin layer on heated rollers which damages its proteins and causes a loss of the milk flavour.

In another known process, the crude chocolate consists of so-called crumb, sugar and cocoa butter. The crumb is the product obtained by drying in vacuo and then grinding a mixture of cocoa mass and sweetened condensed milk. This product gives the chocolate a caramelized, fruity, non-milk flavour.

The processes mentioned above involve prolonged conching over a period of 24 to 48 hours.

Another known process, illustrated for example by GBPS 783,861, is distinguished from the preceding processes by the fact that the cocoa mass and the sugar are mixed with fresh milk in the presence of lecithin, after which the emulsified liquid mixture is dried in the form of a film on heated rollers. The intimate mixture of the principal components of the chocolate in liquid form should enable the organoleptic qualities of the chocolate to be improved while preserving the milk flavour.

It has been found that the roller drying process causes a loss of the volatile cocoa aromas, a loss of the nutritional value of the milk proteins by Maillard reaction and gelatinization of the cocoa starch which has adverse effects on the rheology of the chocolate. The chocolate obtained is insipid.

SUMMARY OF THE INVENTION

The object of the present invention is to obviate the disadvantages of the known processes by providing a crude chocolate powder which has a pure cocoa aroma and a milk note and of which the rheological properties facilitate its processing to chocolate.

The invention relates to a process for the production of a powder for milk chocolate in which a cocoa mass, milk and sugar are mixed and a fatty phase, an aqueous phase and a residue are separated from the mixture by centrifugation, the residue is dispersed in the aqueous phase which is then pasteurized and concentrated, the dispersion obtained is cooled and inoculated with crystals of lactose and the lactose in the dispersion is allowed to crystallize, the suspension containing the crystallized lactose is mixed with the separately pasteurized fatty phase and the mixture is dried by spray drying.

DETAILED DESCRIPTION OF THE INVENTION

To carry out the process of the present invention, milk, preferably fresh whole milk, is pasteurized under controlled conditions, for example for a few seconds to 30 seconds at 70° to 80° C. Under conditions such as these, there is no significant inactivation of lysine. The milk is then cooled to 30°-60° C., for example to approximately 50° C.

A cocoa mass emanating from the grinding of roasted, decorticated and deskinned cocoa beans is then melted at 40°-80° C., for example at approximately 50° C. This mass may be meal containing all the cocoa butter present in the beans, i.e. approximately 54% by weight. It may be the cake obtained from the meal by grinding of the press cake after partial separation of the cocoa butter and may contain 28 to 32% by weight cocoa butter. Sugar is added to the molten cocoa mass in the form of crystallized sugar or in the form of a concentrated aqueous syrup, after which the mixture of sugar and cocoa is incorporated with stirring in the pasteurized milk. The respective ratios by weight of cocoa mass to sugar to milk are 3-9:2-8:84-95, for example 4:3:93. The mixture is preferably cooled rapidly to 5°-10° C. to prevent the growth of microorganisms and to avoid losses of volatile aromas.

The mixture is then heated to 40°-80° C., preferably to around 50° C., and is then treated without delay in a centrifugal separator. The separation is preferably intensive, preferably being carried out for 0.2 to 1 s at 1500-2000 r.p.m. A light brown coloured fatty phase consisting of milk fats, cocoa butter and fat-soluble cocoa aromas and containing 20 to 50% by weight fats, an aqueous phase consisting essentially of skimmed milk and a residue comprising cocoa solids are collected.

The aqueous phase is then cooled, preferably immediately after its separation, to 5°-10° C., after which the residue is incorporated therein in a colloid mill. The dispersion obtained is pasteurized under controlled conditions, for example for a few seconds to 30 seconds at 70°-80° C., to minimize the inactivation of lysine by Maillard reaction and gelatinization of the cocoa starch.

After pasteurization, the dispersion is concentrated, for example by evaporation in a falling-film evaporator, to a dry matter content of 30-60% by weight and preferably to approximately 45% by weight, after which the concentrate is cooled to a temperature of 5°-15° C. and preferably to approximately 10° C. pending its subsequent treatment. Alternatively, the concentrate may be cooled to approximately 35° C. and crystallization of the lactose directly initiated as described hereinafter.

The following step comprises seeding the cooled concentrate with lactose crystals and promoting crystallization of the lactose in the form of fine crystals. The lactose used for seeding should be in the form of fine crystals preferably 2 μm or smaller in size. The quantity of lactose added should be sufficient to initiate crystallization, for example approximately 0.05% by weight, based on dry matter. The crystallization may be carried out in double-jacketed tanks at a temperature not exceeding 35° C. Seeding is preferably carried out at approximately 35° C., the concentrate being cooled to approximately 10° C. during crystallization. Crystallization lasts 3 to 30 h and preferably about 5 h. It is advantageously carried out with slow and continuous stirring.

The suspension containing crystallized lactose obtained is then cooled to a temperature not exceeding 10°

C. and preferably to around 5° C. The fatty phase previously separated is added to the cooled suspension containing crystallized lactose, the fatty phase itself advantageously being cooled to a temperature not exceeding 10° C. and preferably to around 5° C. The fatty phase will advantageously have been heated beforehand to 40°–80° C. and then pasteurized under controlled conditions for a few seconds to 30 mins. at 63°–140° C., for example for approximately 5 seconds at around 120° C., and then homogenized at 5°–80° C. and preferably at around 50° C. under a pressure of 20 to 100 bar and preferably around 50 bar. The mixture contains 40–50% by weight dry matter.

The mixture is then sprayed under a pressure of 60–100 bar at the nozzle and at a temperature not exceeding 10° C. in a spray drying tower through which is passed a stream of very hot air under pressure so that the temperature of the exit air is 80° C. or higher.

In one particular embodiment of the spray drying step, the concentrate and, in particular, the fats which it contains may be protected against the oxidation which could occur during the drying process. To this end, an inert gas, preferably nitrogen, is injected into the concentrate before it is spray dried.

Alternatively, a fat-soluble, preferably natural, antioxidant, for example a mixture of tocopherols, may be added to the concentrate in a quantity of 100 to 200 ppm (parts per million) by weight before spray drying.

Advantageously, all the measures of separation of the fatty and non-fat phases, crystallization of the lactose in the form of fine crystals, addition of the homogenized fatty phase, cooling of the concentrate and cold spraying thereof, preferably at a temperature of 5°–10° C. under high pressure in a stream of very hot air, combine to obtain a maximum of fats in the free state and lactose in the crystallized state and to keep them in those states.

The expression "fats in the free state" is understood to mean that the fats are not coated with protective materials, for example emulsifiers or proteins. In the description, the percentage of free fats is determined by gravimetric measurement of the quantity of fats extractable with petroleum ether based on the total quantity of fats.

After drying, the powder has a percentage moisture content of 1 to 5% and preferably 3% by weight. The lactose is in the form of crystals between 10 and 70 $\mu$m in size.

Instead of whole milk, it is also possible to use partially skimmed milk and to add the milk fats, for example in the form of anhydrous milk fats or a fraction of anhydrous milk fats, thereto at any stage of the process, but preferably just before spray drying, so that the powder contains the milk fats which would have been supplied by the whole milk.

Flavouring agents may of course be mixed with the powder before or after drying. The powder is preferably packed in bags in an inert atmosphere, for example of nitrogen, the bags are sealed and are stored, preferably at a temperature below 10° C.

The invention is illustrated by the following Example in which the percentages and parts are by weight, unless otherwise indicated.

EXAMPLE

Fresh whole milk is pasteurized for 15 s at 80° C. in a tube-type heat exchanger and then cooled to 50° C.

A cocoa mass emanating from the grinding of roasted and decorticated beans and containing 54% fats is melted at 50° C.

4 Parts molten cocoa mass and 3 parts crystallized sugar are mixed with 93 parts pasteurized milk at 50° C., after which the mixture is rapidly cooled to 10° C. The mixture is reheated to 50° C. and then treated in a separator/decanter for 0.5 s at 1800 r.p.m.

A light brown coloured fatty phase comprising 30% fats consisting of the milk fats and the cocoa butter and containing the fat-soluble cocoa aromas, an aqueous phase consisting essentially of skimmed milk and a residue mainly containing the non-fat and water-insoluble cocoa solids are obtained.

The aqueous phase is rapidly cooled to 10° C. and the residue is incorporated therein with stirring in a colloid mill. The dispersion obtained is pasteurized for 30 s at 80° C. in a tube-type heat exchanger and then concentrated to 45% dry matter in a triple-effect falling-film evaporator. The concentrate is cooled to 35° C. in a tube-type heat exchanger and then seeded with 0.05 part lactose crystals 2 $\mu$m or smaller in size, cooling being continued for 5 h to 10° C. with slow and continuous stirring. The concentrate containing the crystallized lactose is then cooled to 5° C. in a tube-type heat exchanger.

The fatty phase, separated by centrifugation as indicated above, is heated to 75° C. and then treated for 5 s at 130° C. by direct injection of steam, followed by cooling to 50° C. in a tube-type heat exchanger. It is then homogenized in a single-stage homogenizer under a pressure of 50 bar and cooled to 5° C. in a tube-type heat exchanger.

The fatty phase mentioned above is incorporated with stirring in the concentrate containing the crystallized lactose.

The mixture containing 45% fats is then sprayed under a pressure of 75 bar by a high-pressure pump into a drying tower through which a stream of air under a pressure of 0.16 bar and at a temperature of 350° C. is passed. At the tower exit, the air has a temperature of 85° C. and a relative humidity of 15%.

The powder (A) collected at the bottom of the tower has the following physical characteristics:

| | |
|---|---|
| water content | 3% |
| specific gravity (kg/l) | 0.58 |
| fats content | 30%, including 82% in the free state (the percentage of fats in the free state is determined as indicated above) |

The lactose is in the form of crystals 10 to 70 $\mu$m in size.

COMPARISON EXAMPLE

For comparison purposes, a powder (B) for milk chocolate is prepared as follows. 1.8 parts sucrose, 1.6 parts cocoa mass containing 31% fats and 0.03 part disodium phosphate are mixed at 25 C. with 45 parts fresh milk containing 12.5% fats. After pasteurization for 1 minute at 90° C., the mixture is concentrated to 67% dry matter in a tubular evaporator and then cooled to 25° C.

The concentrate is then dried to 97% dry matter on an 18 m² roller dryer heated with steam under a pressure of 4 bar and rotating at 2 r.p.m. On leaving the dryer, the product is passed through a 3 mm mesh sieve. Its temperature is 40°-50° C.

The organoleptic properties of powders A and B and aqueous solutions thereof, the nutritional properties of powders A and B and their suitability for processing to chocolate are compared.

1. Organoleptic properties

Powder A is light in colour and has an odour and taste typical of cocoa and a fine structure. Powder B is dark with hardly any taste or odour of cocoa and has a granular structure.

A 40% solution of A in water is fluid and slightly viscous and has a pleasant taste.

By contrast, a 40% solution of B in water is highly viscous and gelatinous and has hardly any taste.

2 Nutritional properties

Powder A shows hardly any milk protein damage whereas the milk proteins are damaged in the case of powder B. Lysine inactivation is approximately 20% for powder B and less than 5% in the case of powder A.

3. Suitability for processing to chocolate

Chocolate is made as follows from powders A and B:

Chocolate A 39.5 parts powder A, 15.4 parts cocoa butter and 40 parts crystallized sugar are mixed in a kneader-mixer. The resulting mixture is then finely ground to a mean particle size of 13 μm and conched for 24 hours at a temperature of 53° to 58° C. The mixture is completed by addition of 5 parts cocoa butter during conching and by addition of 0.2 part lecithin and 0.01 part vanilla in solution in alcohol towards the end of conching. Finally, the chocolate mass is conditioned and moulded.

Chocolate B 37 parts powder B, 18 parts cocoa butter, 39 parts crystallized sugar, 2 parts cocoa mass and 0.1 part lecithin are mixed in a kneader-mixer. The resulting mixture is finely ground to a particle fineness of 13 μm. The mixture is then conched with addition—per step—of 0.06 part lecithin, 3.6 parts cocoa butter and 0.5 part molten butter. Another 0.23 part lecithin and 0.01 part vanillin in solution in alcohol are added towards the end of conching. Finally, the chocolate mass is conditioned and moulded.

Conclusions

Despite the additional introduction of cocoa mass corresponding to a content of non-fat cocoa solids equivalent to that of chocolate A, chocolate B is insipid. In addition, the use of powder B complicates conching, making it necessary to add a larger amount of lecithin and to carry out conching with strict precautions to avoid creaming of the mass. Roller drying caused gelatinization of the cocoa starch.

By contrast, chocolate A has a pleasant creamy taste and a pure cocoa aroma, its texture is not sticky. It is easy to conch and demould.

We claim:

1. A process for the production of a crude chocolate powder comprising:

mixing milk and a cocoa mass and sugar to obtain a mixture;

centrifuging the mixture for separating the mixture to collect a fatty phase, an aqueous phase and a residue;

dispersing the collected residue in the collected aqueous phase to obtain a dispersion;

pasteurizing the dispersion to obtain a pasteurized dispersion;

concentrating the pasteurized dispersion to obtain a concentrate;

cooling the concentrate;

inoculating the cooled concentrate with lactose crystals and allowing lactose in the inoculate concentrate to crystallize into a suspension containing crystallized lactose;

pasteurizing the collected fatty phase subsequent to collecting the fatty phase;

mixing the pasteurized fatty phase and the suspension containing the crystallized lactose to obtain a mixed suspension and fatty phase mixture having fats in a free state and lactose in a crystallized state; and spraying the mixed suspension and fatty phase mixture in a spray drying tower for drying it to obtain a product having fats in a free state and lactose in a crystallized state.

2. A process according to claim 1 wherein the milk has been pasteurized for up to 30 seconds at a temperature of from 70° C. to 80° C. and then cooled to a temperature of from 30° C. to 60° C.

3. A process according to claim 1 wherein the milk has been skimmed and further comprising adding milk fats to the fatty phase and suspension.

4. A process according to claim 1 or 2 or 3 further comprising melting the cocoa mass at a temperature of from 40° C. to 80° C. and wherein the melted cocoa mass then is mixed with the sugar and then with milk with stirring and further comprising cooling the mixture to from 5° C. to 10° C.

5. A process according to claim 1 wherein the pasteurized dispersion is concentrated to form 30% to 60% by weight dry matter, wherein the concentrate is cooled to approximately 35° C. for being inoculated with lactose, wherein the inoculated concentrate is cooled to about 10° C. while allowing lactose crystallization and wherein lactose is allowed to crystallize for from 3 hours to 30 hours.

6. A process according to claim 1 wherein the pasteurized dispersion is concentrated to from 30% to 60% by weight dry matter, wherein the concentrate is cooled to from 5° C. to 15° C. and further comprising subsequently heating the cooled concentrate to a temperature of approximately 35° C. and then inoculating the concentrate with the lactose crystals, wherein the inoculated concentrate is cooled to approximately 10° C. while allowing lactose crystallization and wherein the lactose is allowed to crystallize for from 3 hours to 30 hours.

7. A process according to claim 5 or 6 wherein the suspension containing crystallized lactose is cooled to a temperature not exceeding 10° C. and further comprising cooling the fatty phase to a temperature not exceeding 10° C.

8. A process according to claim 1 further comprising homogenizing the pasteurized fatty phase and then mixing the homogenized fatty phase with the suspension containing the crystallized lactose.

9. A process according to claim 7 further comprising homogenizing the pasteurized fatty phase and then mixing the homogenized fatty phase with the suspension containing the crystallized lactose.

10. A process according to claim 1 wherein the mixed suspension and fatty phase mixture subjected to spraying have a temperature not exceeding 10° C. and are under a pressure of from 60 bar to 100 bar and are sprayed with hot air under pressure so that air exiting the tower is at a temperature of at least 80° C.

11. A process according to claim 9 wherein the mixed suspension and fatty phase mixture subjected to spraying have a temperature not exceeding 10° C. and are under a pressure of from 60 bar to 100 bar and are sprayed with hot air under pressure such that air exiting the tower is at a temperature of at least 80° C.

12. A process according to claim 1 further comprising injecting an inert gas into the mixed suspension and fatty phase mixture and then spraying the gas-injected mixture for drying it.

13. A process according to claim 1 further comprising adding a fat-soluble antioxidant to the mixed suspension and fatty phase mixture and then spraying the mixture containing the added antioxidant for drying it.

14. A process according to claim 1 or 3 further comprising pasteurizing the milk under conditions to avoid inactivation of lysine, cooling the pasteurized milk and then mixing the cooled pasteurized milk with the cocoa mass in molten form and with the sugar in a form of a concentrated aqueous syrup, cooling the mixture to prevent growth of microorganisms and to avoid loss of volatile aromas, heating the cooled mixture to a temperature of from 40° C. to 80° C. and then centrifuging the mixture for collecting the fatty phase, the aqueous phase and the residue, cooling the aqueous phase and then adding the residue to the cooled aqueous phase to obtain the dispersion which thereafter is pasteurized under conditions to avoid inactivation of lysine by maillard reaction and gelatinization of cocoa starch, and further comprising cooling the suspension containing crystallized lactose to a temperature not exceeding 10° C. and cooling the pasteurized fatty phase to a temperature not exceeding 10° C. prior to mixing it with the cooled lactose crystallized suspension.

15. A process according to claim 14 further comprising homogenizing the pasteurized fatty phase and then mixing the homogenized fatty phase with the suspension containing the crystallized lactose.

16. A product of the process of claim 1 or 3.
17. A product of the process of claim 8.
18. A product of the process of claim 14.
19. A product of the process of claim 15.

* * * * *

UNITED STATES PATENT AND TRADEMARK OFFICE
CERTIFICATE OF CORRECTION

PATENT NO. : 5,051,265

DATED : September 24, 1991

INVENTOR(S) : Niklaus MEISTER, et al.

It is certified that error appears in the above-identified patent and that said Letters Patent is hereby corrected as shown below:

On the title page, delete the Abstract and insert the following therefor:

--ABSTRACT OF THE DISCLOSURE

A crude chocolate powder containing free fats and crystallized lactose is prepared from a mixture of milk, a cocoa mass and sugar. The mixture is centrifuged and a fatty phase, an aqueous phase and a residue are collected. The collected residue is dispersed in the collected aqueous phase and the dispersion obtained is pasteurized, concentrated, cooled, and then inoculated with lactose crystals, after which lactose is allowed to crystallize from the concentrate to form a suspension containing crystallized lactose. The collected fatty phase is pasteurized subsequent to collecting it, and the pasteurized fatty phase is mixed with the suspension containing the crystallized lactose while keeping fats in a free state and lactose in a crystallized state, after which this mixture is sprayed in a spray drying tower for drying it for obtaining a product having fats in a free state and lactose in a crystallized state. The crude chocolate powder is employed for preparing milk chocolate products.--

Column 2, line 15, insert a comma after "i.e.".

UNITED STATES PATENT AND TRADEMARK OFFICE
CERTIFICATE OF CORRECTION

PATENT NO. : 5,051,265

DATED : September 24, 1991

INVENTOR(S) : Niklaus MEISTER, et al.

It is certified that error appears in the above-identified patent and that said Letters Patent is hereby corrected as shown below:

Column 4, line 38, delete "containing 45% fats".

Column 6, line 7 [line 16 of claim 1], "inoculate" should be --inoculated--.

Signed and Sealed this

Twenty-second Day of December, 1992

Attest:

DOUGLAS B. COMER

Attesting Officer

Acting Commissioner of Patents and Trademarks